(12) United States Patent
Martin et al.

(10) Patent No.: US 6,196,067 B1
(45) Date of Patent: Mar. 6, 2001

(54) SILICON MICROMACHINED ACCELEROMETER/SEISMOMETER AND METHOD OF MAKING THE SAME

(75) Inventors: Richard D. Martin, Newark, DE (US); W. Thomas Pike, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/072,793

(22) Filed: May 5, 1998

(51) Int. Cl.[7] ................................................ G01P 15/125
(52) U.S. Cl. ......................................................... 73/514.32
(58) Field of Search ............................. 73/514.32, 514.17, 73/514.16, 862.52, 862.61, 862.626

(56) References Cited

U.S. PATENT DOCUMENTS

| | | | |
|---|---|---|---|
| 2,916,279 | * 12/1959 | Stanton | 73/514.32 |
| 5,388,460 | * 2/1995 | Sakurai et al. | 73/514.32 |
| 5,583,291 | * 12/1996 | Gutteridge et al. | 73/514.38 |
| 5,616,844 | * 4/1997 | Suzuki et al. | 73/514.32 |
| 5,719,336 | * 2/1998 | Ando et al. | 73/514.32 |
| 5,814,727 | * 9/1998 | Matsuda | 73/514.17 |
| 5,856,620 | * 1/1999 | Okada | 73/514.32 |

* cited by examiner

Primary Examiner—Hezron Williams
Assistant Examiner—Richard A. Moller
(74) Attorney, Agent, or Firm—Daniel L. Dawes

(57) ABSTRACT

A silicon-based microaccelerometer for seismic application is provided using a low-resonant frequency (10 Hz), large proof mass (1 gram), and high Q suspension to achieve high sensitivity of less than 1 ng with a bandwidth a 0.05 to 50 Hz. The proof mass is cut away from a planar substrate in the form of a disk using abrasive cutting, which disk closely fits but does not touch a surrounding angular frame. The spring of the microaccelerometer between the angular frame and the proof mass is provided from two continuous, 3 microns thick membranes. The fixed capacitive electrodes are provided on separate, subsequently bonded substrates, and movable capacitive plates are provided on the membranes. By fabricating capacitive plates on the separate substrates, the gap between the fixed and movable capacitive plates in the differential capacitive sensor is closely controlled. The use of continuous membranes for the spring produces a shock resistant, robust sensor.

7 Claims, 9 Drawing Sheets

SILICON MICROMACHINED ACCELEROMETER/SEISMOMETER AND METHOD OF MAKING THE SAME

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The invention relates to the field of micromachined accelerometers and seismometers, and in particular to accelerometers and seismometers which can withstand high shock loads.

2. Description of the Prior Art

The measurement of the vibration of celestial bodies is one of the primary methods for determining their mechanical structure. At the planetary level, seismology has already successfully elucidated the internal structure of the Earth and moon. A long-running goal of planetary exploration has been similarly to determine the internal structure of Mars. However, an unambiguous seismic survey of the global structure of the planet requires a long-lived network distributed across the planet. The associated costs of deploying and running conventional seismometers precludes their use in any kind of Martian application.

Seismometers can also determine structure at a more local level and are used on Earth for surveying petroleum reservoirs. Proposals also exist for local seismic surveys of buried liquid water deposits on Mars. For small objects, determination of the vibration spectrum from a single sensor can be used to determine the mechanical structure of the object. Such an application is being considered to determine the relative thickness of the possible ice layer which has been observed on Europa, one of the major moons of Jupiter. A seismic investigation of a comet has been also planned under the name of the Rosetta Mission, which is projected to involve the first landing on the comet.

Common to all these applications is the need for a small, robust and low-powered seismometer with performance comparable to presently available terrestrial seismometers, namely sensitivity to signals below 1 ng/$\sqrt{Hz}$. In order to meet this sensitivity, terrestrial seismometers have low-resonant-frequency suspensions, and this is resulted in bulky, massive instruments which are extremely delicate. Raising the resonant frequency of this seismometer allows a more compact instrument, but is achieved only at the expense of sensitivity.

BRIEF SUMMARY OF THE INVENTION

The invention is a differential capacitive sensor. The sensor comprises a proof mass micromachined in a first silicon substrate. A frame is micromachined in a first silicon substrate to be adjacent to the proof mass. At least one peripheral spring is connected between the frame and the proof mass to suspend the proof mass in the frame substantially without tilt. At least one movable capacitive plate is defined on the proof mass. At least one fixed capacitive plate is defined on at least one separate substrate. The fixed capacitive plate is separately fabricated on the separate substrate. The separate substrate is assembled on the frame and on at least one side of the proof mass thereby opposing the proof mass. The fixed capacitor plate on the substrate is positioned at a predetermined gap distance away from the movable plate. The fixed capacitive plate is disposed on the separate substrate prior to assembly of the separate substrates opposing the proof mass and frame. As a result, the gap distance between the movable and fixed capacitive plates may be closely controlled.

In a first embodiment the spring is coupled between the proof mass and the frame at a plurality of peripherally symmetric positions. In addition in the illustrated embodiment two substrates are employed opposing each side of the proof mass and frame. The proof mass and frame are sandwiched between the pair of substrates. Two fixed capacitive plates are employed. One of the two fixed capacitive plates is disposed on each of the two substrates. The sensor lies substantially in a plane and the proof mass has a six-fold symmetry about a center axis perpendicular to the plane. There are six springs coupled between the frame and proof mass in a six-fold symmetric array.

In a second embodiment the proof mass is a cylindrical disk and the spring is one or more continuous membranes extending between the frame and the proof mass. The proof mass has an upper and lower surface. The spring comprises in particular two continuous membranes extending across the upper and lower surface of the proof mass and between the proof mass and the frame. The proof mass has a mass of at least one gram and the spring provides the sensor with a resonant frequency of less than 100 Hz. More specifically, the resonant frequency is approximately 10 Hz.

Where the proof mass is a circular disk having an upper and lower surface, the frame comprises an angular ring with the peripheral spring comprising an upper and lower continuous membrane extending across the upper and lower surface of the proof mass between the angular ring and the circular disk-shaped proof mass.

The substrate has a cavity defined therein with a predetermined depth such that when the substrate is bonded to the frame. The cavity opposes the proof mass and the gap between the movable plate and the fixed plate is defined only by the depth of the cavity in the fixed substrate. The membranes are formed on separate wafers from the proof mass and the membranes are wafer-bonded to the frame and proof mass.

The invention is also defined as a method of fabricating a differential capacitive sensor comprising the steps of defining or micromachining a suspended proof mass assembly in a first substrate, and micromachining a cavity of predetermined depth in each of a second and third substrates separate from the first substrate. Capacitive plates are provided within the defined cavities in the second and third substrate and on the suspended proof mass assembly. The second and third substrates are assembled onto the first substrate so that the capacitive plates on the second and third substrates oppose the capacitive plate on the suspended proof mass assembly and are separated therefrom by predetermined distance equal to the predetermined depth of the cavity defined in the second and third substrates.

In the step of defining or micromachining the fixed capacitive plates on the second and third substrates, the cavity is etched or defined into the second and third substrates and the capacitive plates provided therein. The gap in the assembled sensor is defined by depth of the cavities defined in the second and third substrates.

In one embodiment the step of defining or micromachining the suspended proof mass assembly comprises forming a spacing layer on the proof mass assembly to define the gap between the capacitive plates when the second and third substrates are bonded to the spacing layer.

The step of defining or micromachining the suspended proof mass assembly comprises micromachining the proof mass, frame and symmetrically extending springs between the frame and proof mass from the first substrate or a peripherally extending membrane formed in a separate wafer. Where the peripherally extending spring is a continuous membrane, it extends between the frame and proof mass at all peripheral points. In the illustrated embodiment two continuous membranes are formed from separate wafers and bonded to each side of the proof mass.

A specifically illustrated embodiment of the invention is a differential capacity of sensor comprising an angular ring-shaped frame. A circular cylindrical proof mass of at least one gram is disposed within the angular ring-shaped frame. A pair of continuous membranes is disposed between the frame and the proof mass. The proof mass is coupled to the pair of continuous membranes, and opposing upper and lower surfaces of the proof mass are coupled to the membranes at a central location of the proof mass. Movable capacitive plates disposed on the membranes. An upper and lower substrate having fixed capacitive plates is disposed within cavities defined therein. The fixed capacitive plates oppose the movable capacitive plates on the membranes. As a result, a robust, compact sensor is provided with high shock resistance and small electrode spacing for increased sensitivity.

The invention, now having been briefly summarized, is illustrated in the following drawings, wherein like elements are referenced by like numerals.

Figure 1:
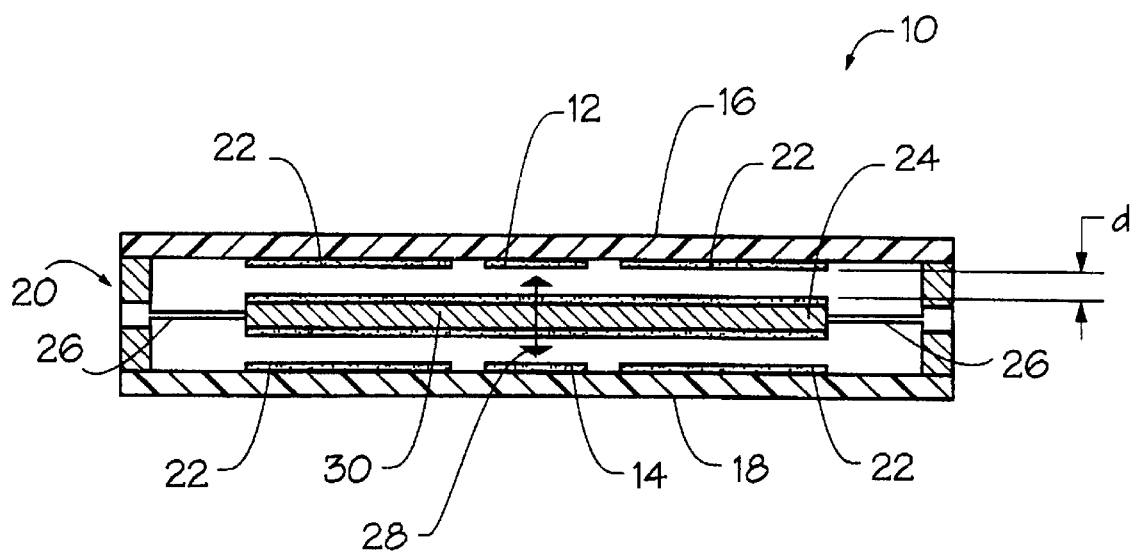
FIG. 1 is a simplified side-cross sectional view of a first embodiment invention, taken through a diameter of the accelerometer.

The invention now having been illustrated in the foregoing drawings, the illustrated and other embodiments are best understood by now turning to the following detailed description.

DETAILED DESCRIPTION OF THE PREFERRED EMBODIMENTS

A silicon-based microaccelerometer for seismic application is provided using a low-resonant frequency (10 Hz), large proof mass (1 gram), and high Q suspension to achieve high sensitivity of less than 1 ng with a bandwidth a 0.05 to 50 Hz. The proof mass is cut away from a planar substrate in the form of a disk using abrasive cutting, which disk closely fits but does not touch a surrounding angular frame. The spring of the microaccelerometer between the angular frame and the proof mass is provided from two continuous, 3 microns thick membranes. The fixed capacitive electrodes are provided on separate, subsequently bonded substrates, and movable capacitive plates are provided on the membranes. By fabricating capacitive plates on the separate substrates, the gap between the fixed and movable capacitive plates in the differential capacitive sensor is closely controlled. The use of continuous membranes for the spring produces a shock resistant, robust sensor.

An accelerometer is comprised of a proof mass coupled to a suspension which is a driven by a damped harmonic oscillator. The equation of motion for this type of mechanical system is:

$$\frac{d^2 z}{dt^2} + \frac{\omega_0}{Q}\frac{dz}{dt} + \omega_0^2 z = a_{ext}\sin(\omega_{ext}t)$$

where $\omega_0$ is the natural frequency of the spring ($\omega_0 = \sqrt{k/m}$) in radians per second, Q is the quality factor of the suspension, $a_{ext}$ is the amplitude of the external acceleration ($F_{ext}/m$) in m/sec² and $\omega_{ext}$ is the angular frequency of the driving force in radians per second. The solutions to this system are sinusoidal and are in the form of:

$$z = z_0 \sin \omega_{xt}t + \phi$$

where $z_0$ is the amplitude of the proof mass displacement and $\phi$ is the phase of the response relative to the driving force and are given by the following equations:

$$z_0 = \frac{a_{ext}}{\sqrt{(\omega_0 - \omega_{ext})^2 + (\omega_0\omega_{ext}/Q)^2}}$$

$$\varphi = \tan^{-1}\left(\frac{-\omega_0\omega_{ext}}{Q(\omega_0^2 - \omega_{ext}^2)}\right)$$

The displacement, $z_0$ of the proof mass is related to the frequency and magnitude of the external force. By measuring the deflection of the proof mass, the external acceleration can be determined. This is usually achieved using piezoelectric or piezoresistive materials or measuring the change in capacitance between two plates. The capacitive technique has the greatest sensitivity and is used in the accelerometer design discussed below.

The capacitance between the plates with the surface area, A, separated by a distance, d, is given by:

$$C = \varepsilon \frac{A}{d}$$

where $\varepsilon$ is the dielectric constant of the medium between the plates (which for air is approximately equal to $8.85 \times 10^{-12}$ F/m). If a capacitor plate is attached to the proof mass, a force on the sensor will produce a displacement ($\Delta d$), and proof mass/capacitor plate which will result in a change of capacitance.

FIG. 1 is a simplified cross-sectional side view of a capacitor accelerometer fabricated according to these principles. The accelerometer, generally denoted by reference numeral 10, is comprised of an upper capacitive 12 and lower capacitive plate 14 mounted on silicon substrates 16 and 18, respectively, performing a rigid frame, denoted by reference numeral 20. Proof mass 24 is balanced by a pair electrostatic force through the means of electrostatic feedback electrodes 22. Electrostatic feedback electrodes 22 are provided around upper and lower capacitive plates 12 and 14 on substrates 16 and 18 and are used in a conventional manner to produce a feedback signal for offsetting or balancing proof mass 24. The circuits used for balancing proof mass 24 and used for correcting for any bias or tilt are conventional and are not shown for the sake of simplicity of illustration. The electrostatic balancing force is used to center proof mass 24 in frame 20 under a gravitational field as well as during launch and deployment in space or an extraterrestrial location.

Suspended between upper and lower capacitive plates 12 and 14 is a proof mass 24. Proof Mass 24 is connected to frame 20 by a plurality of springs 26. Proof mass 24 may vibrate in the vertical direction of arrow 28 on its suspension in frame 20 provided by springs 26. A center capacitor plate is provided symmetrically on the both sides of proof mass 24 suspended by springs 26 as shown in FIG. 1.

Since the area of plates 12, 14 and 30 is constant, the change of capacitance resulting from the displacement in the direction of arrow 28, $\Delta d$, is $$\Delta C = \frac{\varepsilon A}{d_0(d_0 + \Delta d)} \Delta d$$
$$\approx \frac{\varepsilon A}{d_0^2} \Delta d$$

where $d_0$ is the width of the gap at rest. This equation illustrates that the sensitivity (F/m) will increase with the square of the distance between the electrodes. Therefore, a small gap do is desired for high sensitivity.

Figure 2:
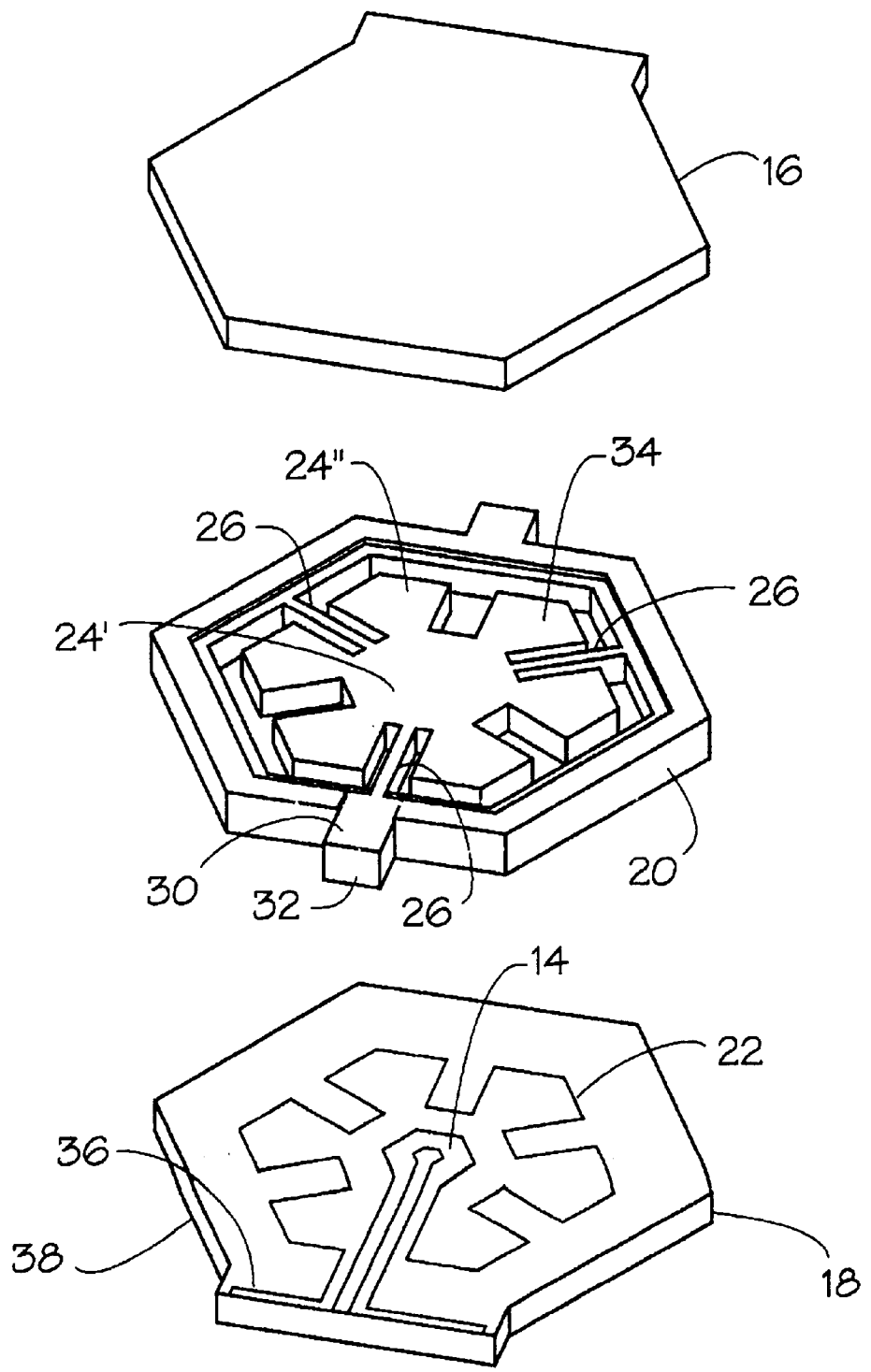
FIG. 2 is a perspective view of the accelerometer FIG. 1 shown in exploded view.

FIG. 2 is an exploded perspective view of the seismometer of FIG. 1. Substrates 16 and 18 can be fabricated from silicon or quartz and contain signal capacitor plates 12 and 14 to measure the gap in the sensor as well as the electrostatic feedback plate 22. Proof mass 24 and frame 20, which are fabricated from crystalline silicon are sandwiched between substrates 16 and 18. In the first illustrated embodiment, proof mass 24 forms an integral, six leaf clover pattern with a center area 24' and leaves 24". The leaves 24" of proof mass 24 have a generally hexagonal outer envelope and are disposed in a hexagonal frame 20. Proof mass 24 is symmetrically suspended in frame 20 by six springs 26, the upper three of which are shown in FIG. 2. The upper three springs 26 extend from frame 20 to center portion 24' of proof mass 24 in the gap between every other leaf 24". The lower three springs 26 extend from frame 20 to center portion 24' of proof mass 24 in the gap between the alternate leaves 24" so that every gap between leaves 24" has either a lower or upper spring 26 disposed therein, but not both. Proof mass 24 is provided with ground or center plate 30 provided with a connection pad 32 extending from one of springs 26. Plate 30 may be formed only on center portion 24' or on both center portion 24' and leaves 24".

Electrostatic feedback plates 22 on hexagonal bottom substrate 18 have a clover leaf shape and area conforming to plate 30 as shown in FIG. 2 which is coupled to a force balancing terminal 36. Lower capacitor plate 14 is coupled to on sensor terminal 38. Terminals 36 and 38 are positioned on or near one exterior edge of bottom substrate 18. A similar configuration for electrostatic feedback plates 22, upper capacitor plate 12 and terminals 36 and 38 corresponding thereto is provided on upper substrate 16 although not shown in the perspective view. Thus, proof mass capacitor plate 24 supported by six symmetrically positioned single crystalline silicon springs extending from frame 20 to the top and bottom edges of proof mass 24 forming a supporting suspension system or net.

Springs 26 in the first illustrated embodiment have dimensions of 8.5 mm by 2 mm by 10 microns thick and are designed to yield a natural frequency for proof mass 24 of 10 Hz. The arrangement of six springs 26 around proof mass 24 is designed to eliminate any tilt of mass 24 and to result in its parallel displacement between the capacitor plates as well as prevent any rotation of center plate 30. Also, symmetry of the structure will insure that the net stress of the system is zero. The size and thickness of proof mass 24 is designed to yield a proof mass of approximately 1 gram. This relatively large proof mass is needed to lower the thermal noise equivalent acceleration noise to less than 1 ng. The low mass, power requirements, and electrostatic feedback capability allow the random deployment for three-axis device. The relatively low resonant frequency and large proof mass makes the seismometer much more sensitive within the seismic frequency band than other microaccelerometers available.

In the first embodiment proof mass 24 and springs 26 are formed using conventional selective etching techniques from a 1 millimeter thick silicon wafer which has four layers of epitaxial growth on each side as schematically illustrated in FIGS. 3a–d. Fabrication, as shown on FIG. 3a begins with a 2 inch diameter silicon wafer which is 1 mm thick. Four layers of epitaxial silicon are grown by low-pressure, chemical vapor deposition on each side of wafer 40. These layers of epitaxial silicon include two 2 micron etch stop layers 42, sandwiching a 6-micron spring layer 44 and finishing on each side with a 10-micron spacer layer 46.

Figure 3A:
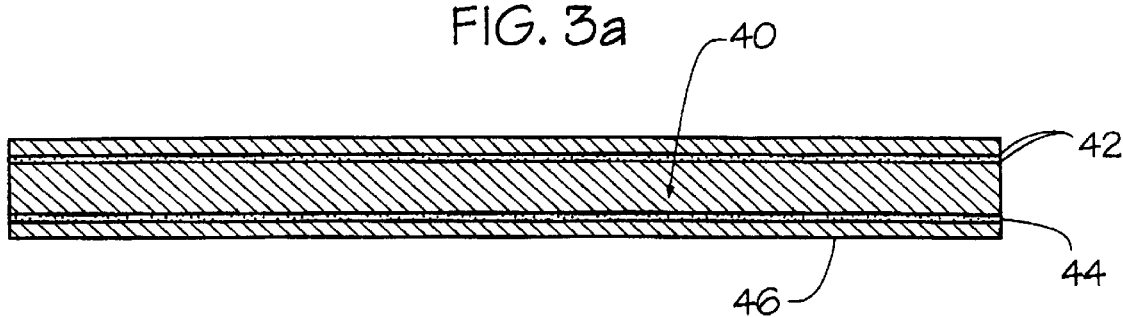
FIGS. 3a–3d are simplified side-cross sectional views illustrating the process by which the device of FIGS. 1 and 2 is fabricated.
Figure 3B:
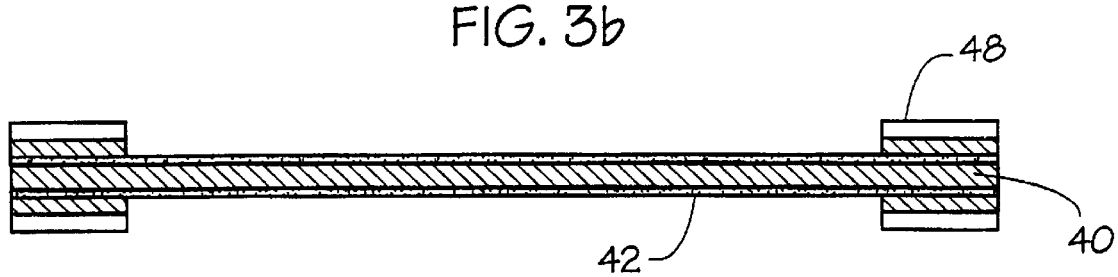
Figure 3C:
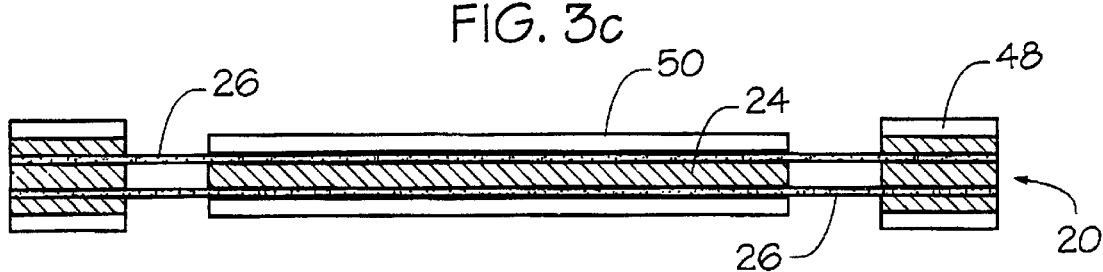
Figure 3D:
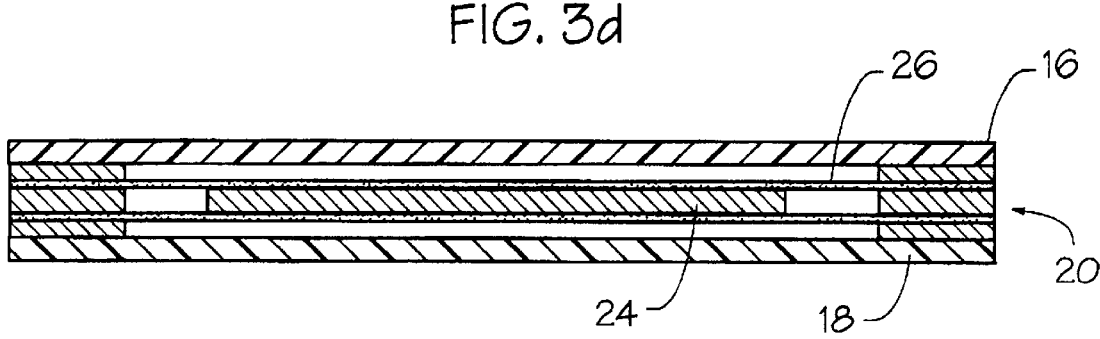

The silicon dioxide mask 48 is laid down to form the edges of what will become frame 20 and the 10-micron spacer layer 46 is selectively etched from the top and bottom, using first p++ etched top layer 42 as an etch stop. The resulting structure is shown in FIG. 3b. A second silicon dioxide mask 50 is then laid down on the center of the structure and wafer 40 is selectively etched to define proof mass 24 as described in connection with FIG. 2 using selective wet chemical etchant. Silicon dioxide masks 48 and 50 are then removed and substrates 16 and 18, prepared as described in connection with FIG. 2, added or attached by wafer bonding to complete the frame assembly. The result is the completed accelerometer shown in FIG. 3d.

FIGS. 4a–f and FIGS. 5a–e illustrate a second embodiment of the invention and its manufacture. Turn first to the processing steps as shown in FIGS. 4a–f. In the first step, a silicon wafer 52 in the shape of a circular disk has upper and lower center bond areas 54 defined by etch masks on its top and bottom surfaces, together with an upper and lower radial bond area 56. Portions of wafer 52 between bond areas 54 and 56 are then partially etched away to form a shallow cavity 58. Cavity 58 in the illustrated embodiment has a depth of approximately 1 to 100 microns. Bond areas 54 and 56 are provided with a bonding layer, such as a metallic or gold layer which can later be used to bond to a silicon membrane.

Figure 4A:
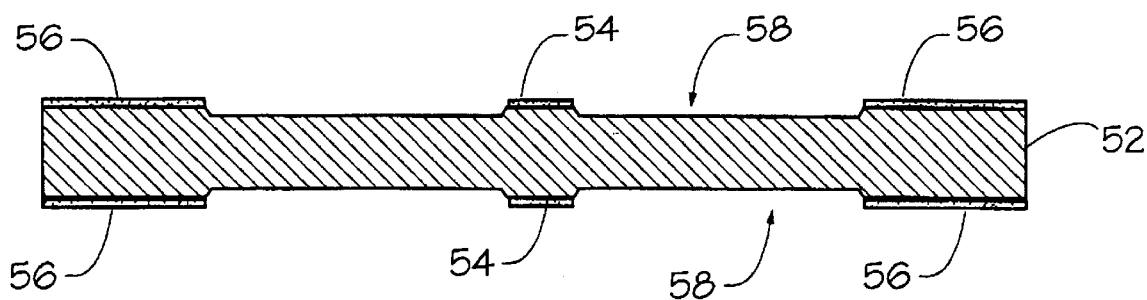
FIGS. 4a–f are simplified cross-sectional side views, illustrating the process by which a second embodiment of the invention is fabricated.
Figure 4B:
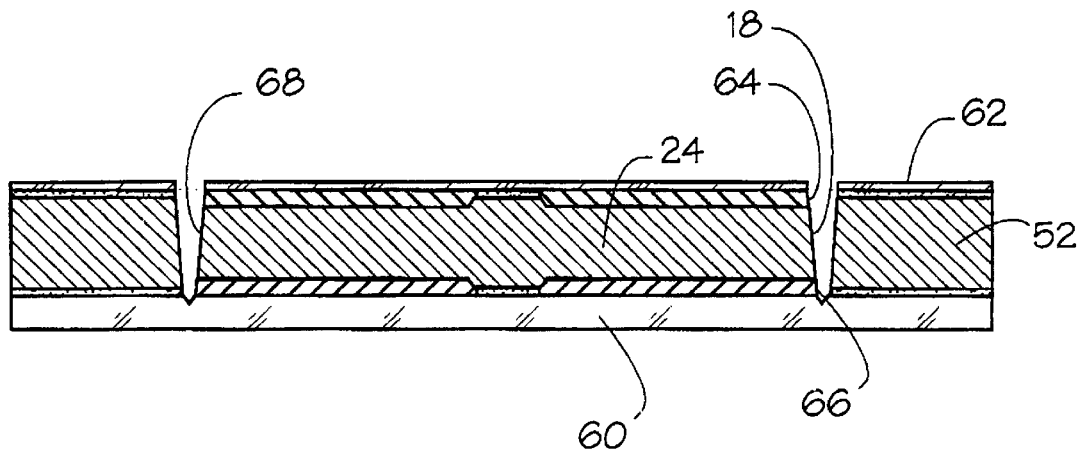

As shown in FIG. 4b, wafer 52 then has cavities 58 filled with two different sacrificial layers, sacrificial layer 64 in the upper cavity 58 and sacrificial layer 66 in the lower cavity 58, and is then sandwiched between glass layers 60 and 62. Glass layer 60 is the thinner of the two glass layers 60 and 62 and is approximately 100 microns thick (the thickness of a conventional microscope cover sheet) while layer 60 is approximately 500 microns thick. The thicknesses are not critical since layers 60 and 62 serve only as a means of mechanically supporting the underlying silicon layers during abrasive cutting. The structure is sufficiently mechanically supported that the proof mass 24 can now be defined by abrasively cutting a circular groove 68 through glass layer 62, sacrificial layer 64, wafer 52, second sacrificial layer 66 and partially into bottom layer 60, resulting in the structure of FIG. 4b.

Figure 4C:
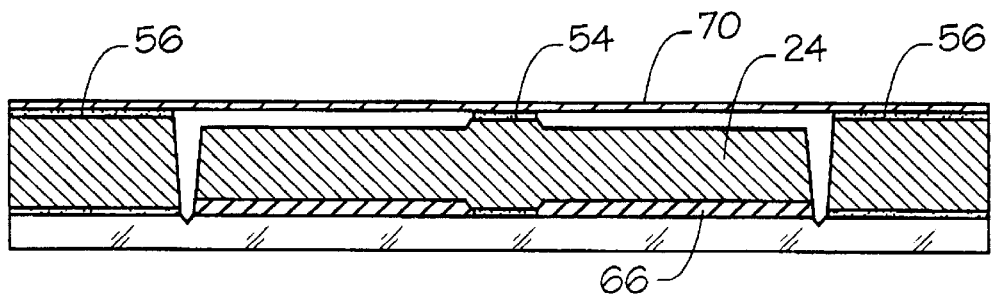
Figure 4D:
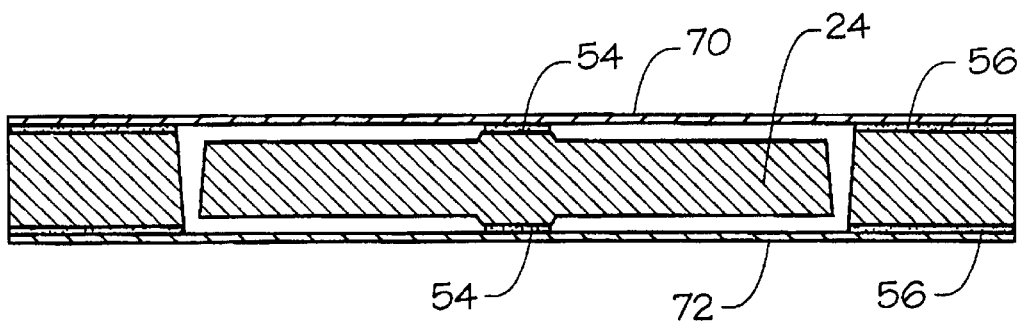

Sacrificial layer 64 is then selectively removed along with its associated glass layer 62 as shown in FIG. 4c and a thin silicon membrane 70, which is approximately 5 to 20 microns thick, is then bonded to upper bond areas 54 and 56. Thereafter, lower sacrificial layer 66 is similarly removed and lower bond areas 54 and 56 are then bonded to a second lower thin silicon membrane 72, as shown in FIG. 4d of identical or similar thickness.

Figure 4E:
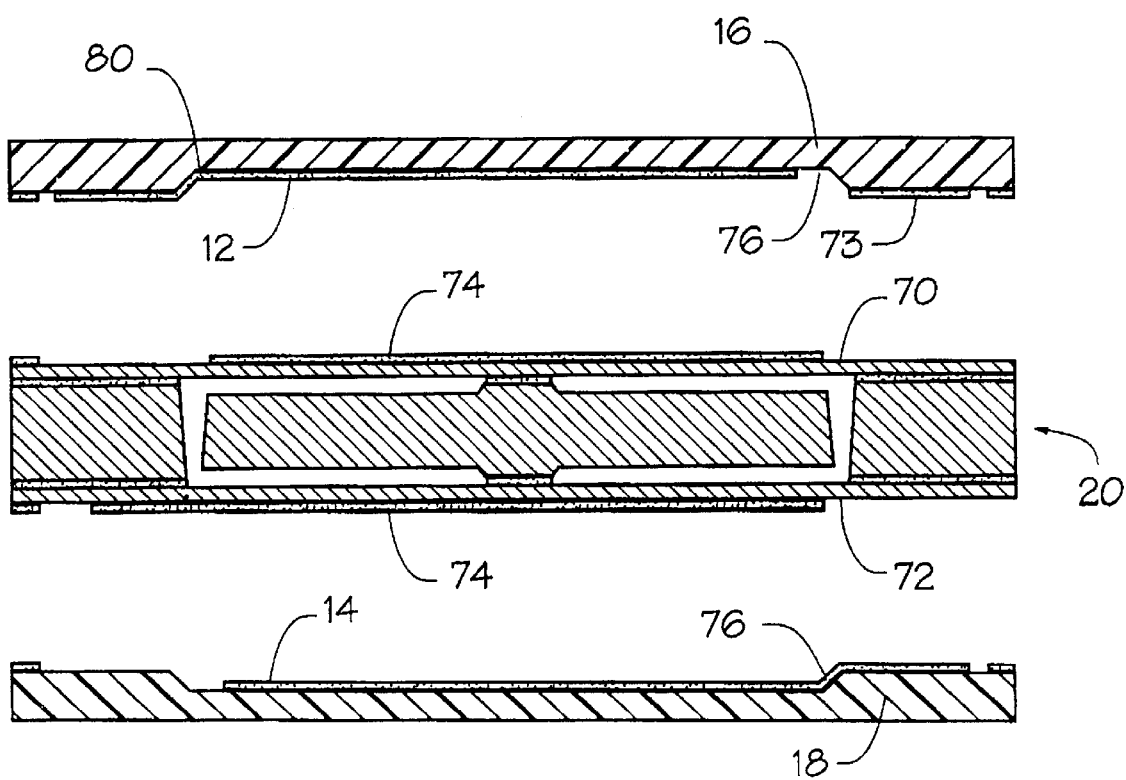

Electrode 74 as shown in 4e are then selectively laid down and etched to form the movable capacitive plates on membranes 70 and 72 using conventional photolithographic techniques. Opposing upper and lower fixed capacitive plates 12 and 14 are disposed and selectively patterned on upper and lower substrates 16 and 18, respectively, along with a bonding layer 73. As shown in FIG. 4e, upper and lower substrates 16 and 18 are preferentially also etched to form a cavity 76 into which electrodes 12 and 14 are disposed. Cavity 76 is approximately 1 to 100 microns deep and define the gap of the capacitive sensor.

Figure 4F:
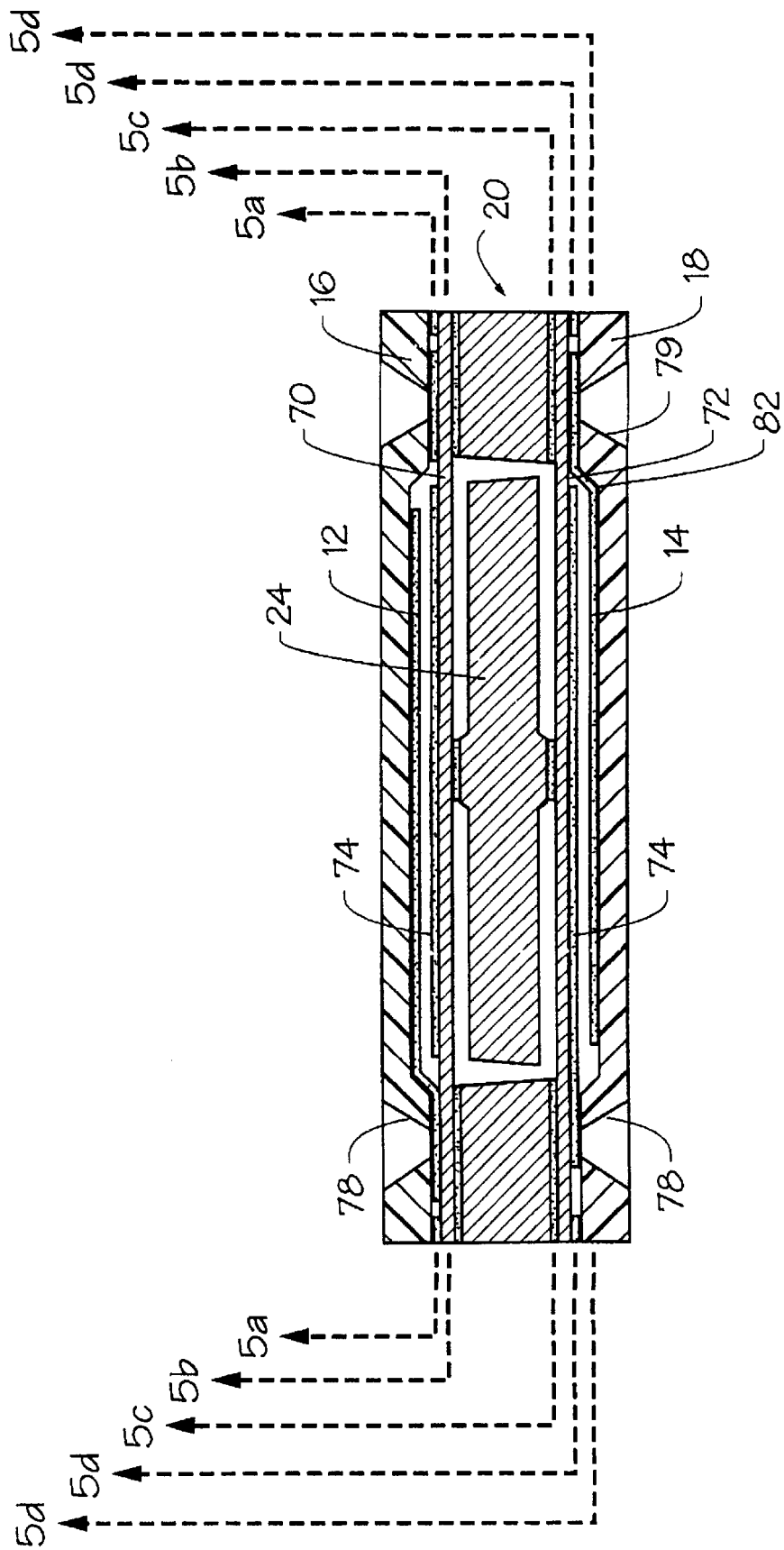

Substrates 16 and 18 carrying the electrodes are then wafer-bonded to prepared wafer 52 forming frame 20 as shown in FIG. 4f resulting in the completed structure in which proof mass 24 is a circular disk and therefore azimuthally symmetric and attached firmly at its upper and lower center regions to upper and lower membrane 70 and 72 upon which the pair of capacitive plates 74 is formed.

Figure 5A:
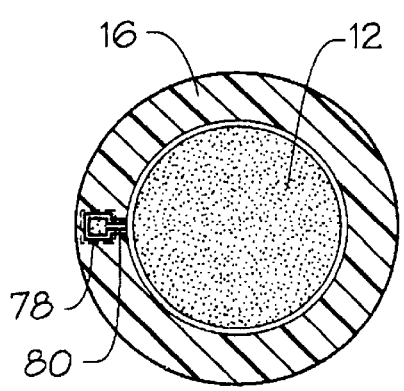
FIGS. 5a–5e are a plan elevational views of the wafer surfaces of the device fabricated according to a method of FIGS. 4a–4f.
Figure 5B:
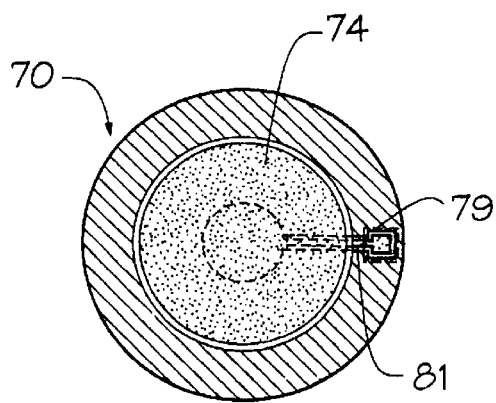
Figure 5C:
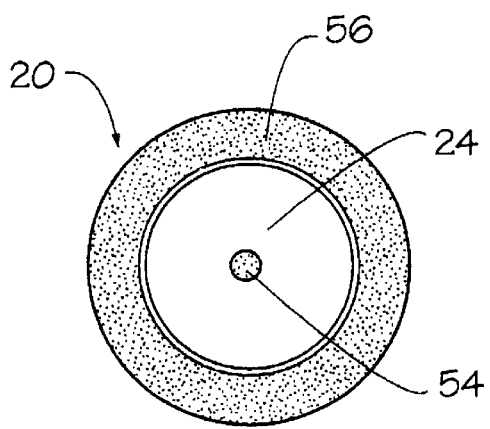
Figure 5D:
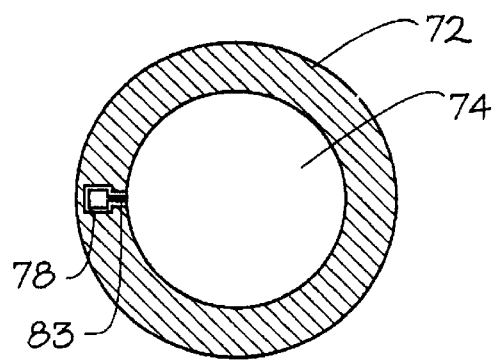
Figure 5E:
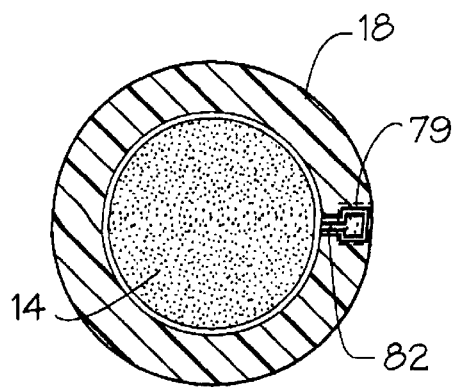

The resulting structure can be readily visualized by turning to FIGS. 5a–e, wherein each of the major layers are shown in plan elevation view, separated laterally one from the other to enable illustration. FIG. 5a illustrates in plan view substrate 16 as seen through section lines 5a—5a of FIG. 4f in which upper electrode 12 is extended and accessed through via 78 by connecting line 80. FIG. 5b is a plan elevational view of upper membrane 70 as seen through section lines 5b—5b of FIG. 4f in which electrode 74 is coupled to line 81 accessed through via 78 diametrically opposing via 78, thus forming opposing plates 12 and 74 of the upper capacitive pair. Similarly, FIG. 5c is a plan elevational view of proof mass 74 and its bonding area 54 and 56 as seen through section lines 5c—5c of FIG. 4f. Lower membrane 72 is depicted in plan elevational view in FIG. 5d showing electrodes 74 coupled to line 83 and accessible through via 78 as seen through section lines 5d—5d of FIG. 4f. FIG. 5e as seen through section lines 5e—5e of FIG. 4f shows lower substrate 18 upon which lower capacitive plate 14 is defined coupled to line 82 and accessible through via 79 on the right to provide the lower pair of capacitive plates 74 and 14. In the illustrated embodiment each of the layers illustrated in FIGS. 5a–5e are approximately 22 millimeters in diameter with the diameter of proof mass 24 being approximately 15 to 20 mm.

The advantage of the embodiment FIGS. 4a–e and 5a–e is the use of continuous membranes 70 and 72 with a symmetric circular geometry that provides a robust suspension which supports mass 24 from frame 20 at every point on its periphery. Tight lateral tolerances minimize the shock effects on the seismometer.

The resulting design is a robust suspension for seismometer used in a high shock deployment. The robustness arises from the use of its symmetrical, disk shaped continuous membranes. The small electrodes spacing provides an increased sensitivity and increases electrostatic feedback forces. An isotopic etching is used to form cavity 76. Shallow cavities typically less than 10 microns deep are realized. Use of bonding to separate proof mass 24 and springs provided by membranes 70 and 72 on separate wafers results in a compact geometry. Thus, the processing avoids the use of EDP or deep etching of the wafer, which etching results in angular structures acting as stress concentrators. Electrode access is made through the wafer by means of vias 78 and 79 which are located outside the mechanical structure of the accelerometer. The spring of the accelerometer is produced by two continuous 3-micron thick membranes 70 and 72. The proof mass 24 is a disk close fitting but not touching frame 20. Proof mass 24 is cut from wafer 52, using the abrasive cutting which produces a kerf of less than 50 microns into the 500-micron wafer. Although circular kerf is described, any pattern is contemplated as being within the scope of the invention. A lateral play of the suspension of proof mass 24 is thus substantially minimized.

Bonding in the device is achieved through gold-to-gold high pressure contact with vacuum chamber at 400° C. By locating proof mass 24 and its spring on the wafers 70 and 72 on separate wafers that are subsequently bonded, a large proof mass 24 and large effective spring can be produced in a very compact configuration, thus providing a 10 Hz resonance suspension in a 22 millimeter diameter structure.

Figure 7:
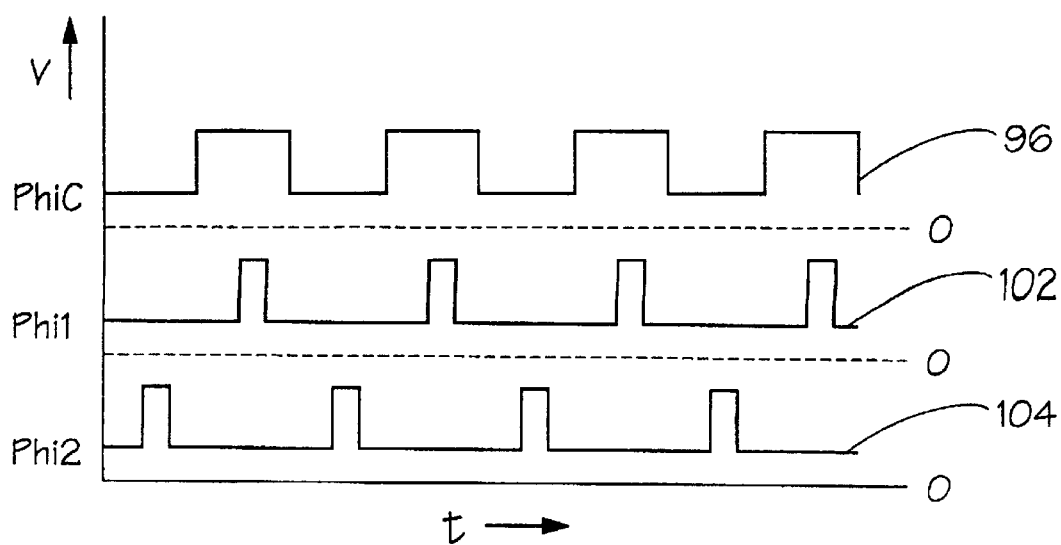
FIG. 7 is a time line diagram showing the switched signals used in the circuit of FIG. 6.
Figure 6:
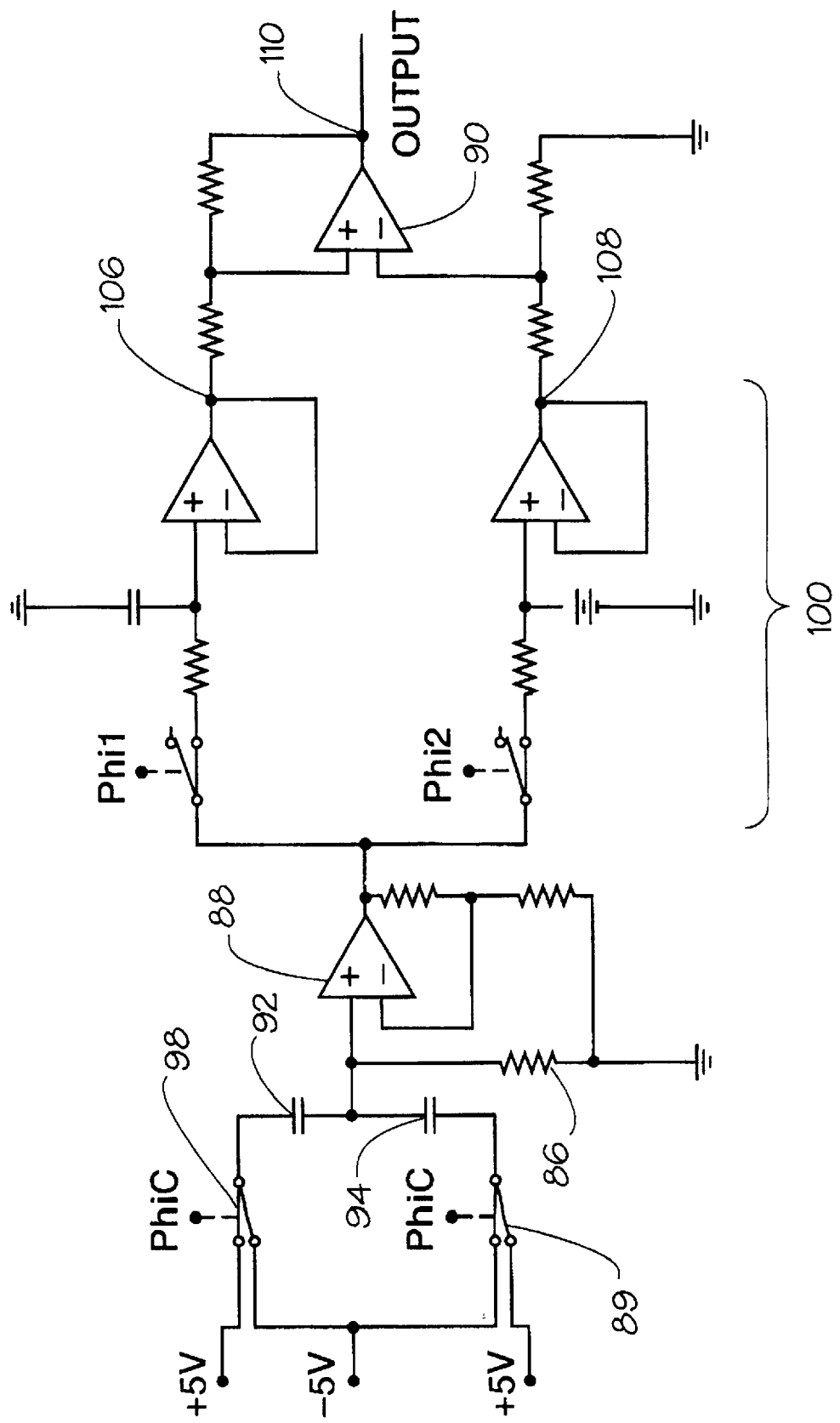
FIG. 6 is a schematic for switched compactor transducer circuit utilized with the capacitive sensor of the above embodiments.

The illustrated embodiment of the seismometer FIG. 1–5e are coupled to a switched capacitive transducer as shown in schematic view in FIG. 6 and generally denoted by reference numeral 84. Transducer 84 is a low power switched capacitive transducer based upon recent development in low power, low noise CMOS amplifiers. The principle of operation is similar to a purely analog Blumlein bridge with the switches producing a square wave rather than a sinusoidal voltage typical of the Blumlein bridge across the pair of differential sensing capacitors formed by the pair of plates in FIGS. 1–5e. One of the major design choices is the value of the input resistor 86 to the preamplifier 88 and to the performance of amplifier 90 itself. Plates 12 and 74 on upper membrane 70 comprise the upper sensor 92 denoted in schematic of FIG. 6, while lower plates 14 and 74 on lower membrane 72 comprise the second sensor 94 in FIG. 6. A switched plus and minus 5 volts is applied as a signal PhiC shown by line 96 in the time graph of FIG. 7. FIG. 7 show time on the horizontal axis and voltage for PhiC, Phi1 and Phi2 along the vertical axis is parallel for each of these signals. Clocked charging switches 98 are diagrammatically shown in FIG. 6 coupling PhiC to sensor 92 and its complement to sensor 94. The clock for driving switches 98 is conventional and has been omitted for the sake of clarity. PhiC is thus applied to plates 12 and 14 in sensors 92 and 94 with opposite phases.

The signal from the membrane electrodes 74 is provided with the input signal to preamplifier 88, which is coupled by resistor 86 to ground. Low power in preamplifier 88 comes with a concomitant to reduced gain bandwidth. The base clock speed for the charging switches 98 is thereby limited to a few kHz to maintain a reasonable gain in preamplifier 88. Thus, in order to avoid attenuation of the signal, a large input resistor 86 is provided. Although the Johnson noise from resistor 86 is also an input to preamplifier 88, this noise is rolled off by the low pass RC value of input resistor 86 in parallel sensor capacitors 92 and 94. As the noise increases as the $\sqrt{R}$, where R is the resistance of resistor 86, the roll off varies as 1/R insofar as the Johnson noise is concerned. In practice, due to current noise in preamplifier 88, a value of a few tens of megaohms is generally optimum for 10 pF sensor capacitors 92 and 94.

The output of preamplifier 88 is then coupled to a switched sample and hold circuit 100 driven by synchronized complimentary clock signals Phi1 and Phi2 shown in time lines 102 and 104 of FIG. 7 respectively. The sensed signals on capacitor sensors 92 and 94 are sampled and held and provided at output nodes 106 and 108, respectively, in sample and hold circuit 100. The differential signal between sensors 92 and 94 are then amplified by amplifier 90 and provided by output node 110.

Figure 8:
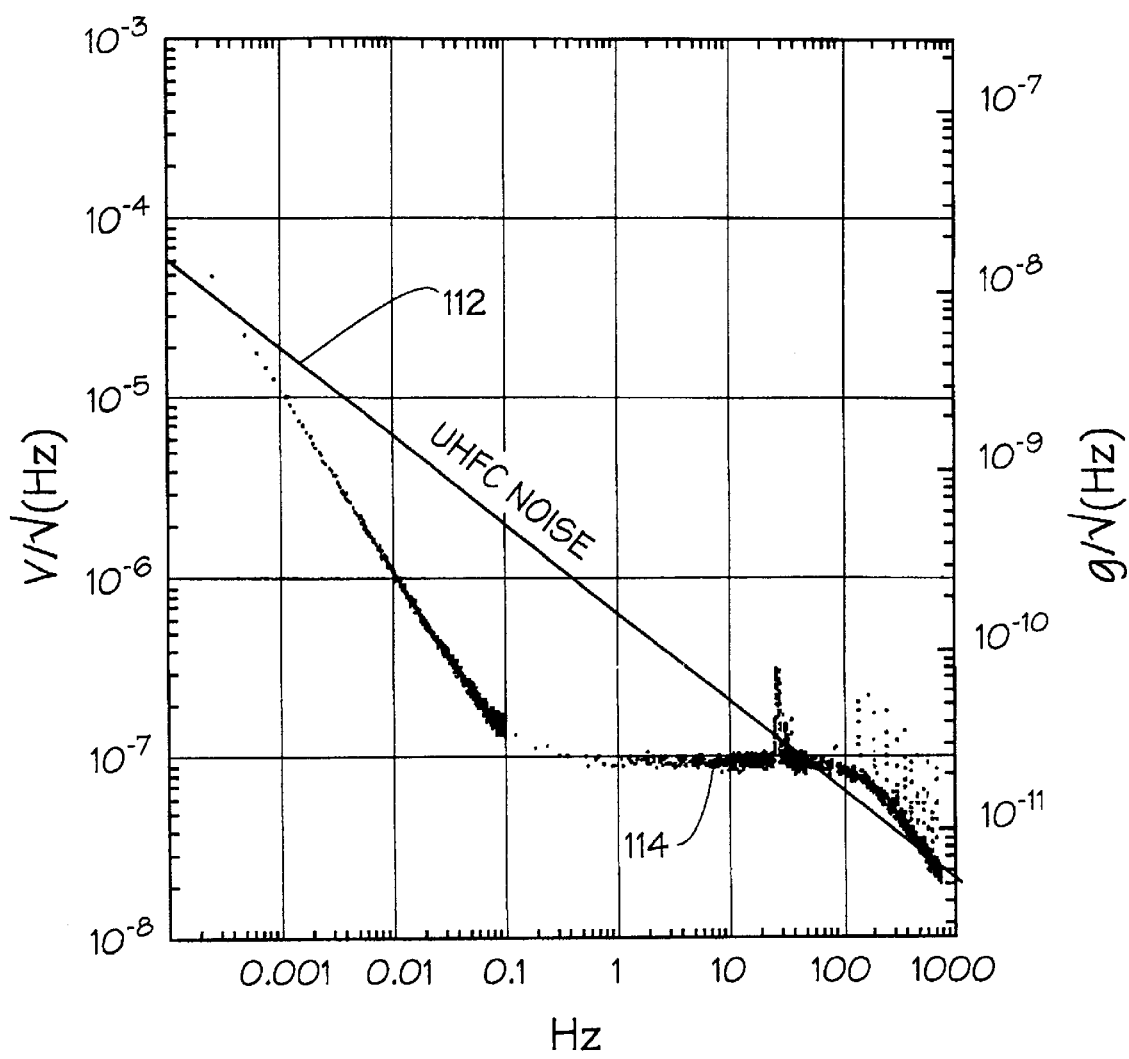
FIG. 8 is a log-log graph of the noise of the circuit of FIG. 6 in which frequencies are plotted along a horizontal axis with noise in V/√Hz on the left vertical axis and in g/√Hz on the right vertical axis.

The noise from transducer 84 is shown in the graph of FIG. 8. Assuming as disclosed above a switched voltage of ±5 volts and a 10 pF sensor capacitance for differential capacitors 92 and 94. The total power of the analog digital parts of the circuit is 2 mW. As can be seen from the log-log plot of graph of FIG. 8 where the horizontal axis is frequency and the vertical scales are $V/\sqrt{Hz}$ on the left and $g/\sqrt{Hz}$ on the right. The noise is substantially white for frequencies above about 0.1 Hz. The low frequency behavior is determined by the choice of preamplifier 88, which in the case of the illustrated embodiment, the power of the noise increases as $1/f^2$ where f is the frequency. It is anticipated that other choices for the amplifier may improve the low frequency performance of transducer 84. Line 112 illustrates the noise level for an ultra high frequency capacitance (UHFC) transducer showing that the noise level in the illustrated invention is less than an UHFC transducer over substantially all portions of interest. For a 10 pF sensor capacitance with a 10 micron gap resonating at 10 Hz, the acceleration noise as plotted in FIG. 8 is $2 \times 10^{-11}$ $g/\sqrt{Hz}$.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A micromachined differential capacitive sensor comprising:

a proof mass micromachined in a first silicon substrate in which said proof mass is defined by a predetermined mass;

a frame adjacent to said proof mass;

at least one peripheral spring connected between said frame and said proof mass to suspend said proof mass substantially without tilt;

at least one movable capacitive plate carried by said proof mass;

at least one fixed capacitive plate; and at least one separate substrate upon which said fixed capacitive plate is separately fabricated, said separate substrate being assembled on said frame and on at least one side of said proof mass thereby opposing said proof mass, said fixed capacitor plate on said substrate being positioned at a predetermined gap away from said movable plate, said fixed capacitive plate being disposed in an etched cavity defined in said separate substrate prior to assembly of said separate substrates opposing said proof mass and frame, said predetermined gap having an initial size defined as the distance between said fixed capacitor plate and said movable plate when said fixed capacitor plate and said movable plate are both at rest with respect to each other, wherein said proof mass is a cylindrical disk and wherein said spring is at least one continuous membrane extending between said frame and said proof mass.

2. The sensor of claim 1 wherein said proof mass has an upper and lower surface, and wherein said spring comprises two continuous membranes extending across said upper and lower surface of said proof mass and between said proof mass and said frame.

3. A micromachined differential capacitive sensor comprising:

a proof mass micromachined in a first silicon substrate in which said proof mass is defined by a predetermined mass;

a frame adjacent to said proof mass;

at least one peripheral spring connected between said frame and said proof mass to suspend said proof mass substantially without tilt;

at least one movable capacitive plate carried by said proof mass;

at least one fixed capacitive plate; and at least one separate substrate upon which said fixed capacitive plate is separately fabricated, said separate substrate being assembled on said frame and on at least one side of said proof mass thereby opposing said proof mass, said fixed capacitor plate on said substrate being positioned at a predetermined gap away from said movable plate, said fixed capacitive plate being disposed in an etched cavity defined in said separate substrate prior to assembly of said separate substrates opposing said proof mass and frame, said predetermined gap having an initial size defined as the distance between said fixed capacitor plate and said movable plate when said fixed capacitor plate and said movable plate are both at rest with respect to each other, wherein said peripheral spring is an integral membrane and said proof mass has a mass of at least one gram.

4. A micromachined differential capacitive sensor comprising:
- a proof mass micromachined in a first silicon substrate in which said proof mass is defined by a predetermined mass;
- a frame adjacent to said proof mass;
- at least one peripheral spring connected between said frame and said proof mass to suspend said proof mass substantially without tilt;
- at least one movable capacitive plate carried by said proof mass;
- at least one fixed capacitive plate; and
- at least one separate substrate upon which said fixed capacitive plate is separately fabricated, said separate substrate being assembled on said frame and on at least one side of said proof mass thereby opposing said proof mass, said fixed capacitor plate on said substrate being positioned at a predetermined gap away from said movable plate, said fixed capacitive plate being disposed in an etched cavity defined in said separate substrate prior to assembly of said separate substrates opposing said proof mass and frame, said predetermined gap having an initial size defined as the distance between said fixed capacitor plate and said movable plate when said fixed capacitor plate and said movable plate are both at rest with respect to each other,
- wherein said spring and said proof mass are micromachined elements and wherein said spring has a stiffness relative to said mass of said proof mass so that said sensor has a resonant frequency of approximately 10 Hz, and
- wherein said peripheral spring is an integral membrane and said proof mass has a mass of at least one gram.

5. A differential capacitive sensor comprising:
- a proof mass micromachined in a first silicon substrate;
- a frame adjacent to said proof mass;
- at least one peripheral spring connected between said frame and said proof mass to suspend said proof mass substantially without tilt;
- at least one movable capacitive plate carried by said proof mass;
- at least one fixed capacitive plate; and
- at least one separate substrate upon which said fixed capacitive plate is separately fabricated, said separate substrate being assembled on said frame and on at least one side of said proof mass thereby opposing said proof mass, said fixed capacitor plate on said substrate being positioned at a predetermined gap away from said movable plate, said fixed capacitive plate being disposed on said separate substrate prior to assembly of said separate substrates opposing said proof mass and frame, said predetermined gap having an initial size defined as the distance between said fixed capacitor plate and said movable plate when said fixed capacitor plate and said movable plate are both at rest with respect to each other,
- wherein said proof mass is a circular disk having an upper and lower surface, and wherein said frame comprises an angular ring with said peripheral spring comprising an upper and lower continuous membrane extending across said upper and lower surface of said proof mass between said angular ring and said circular disk-shaped proof mass.

6. The sensor of claim 5 wherein said membranes are formed on separate wafers from said proof mass and wherein said membranes are wafer-bonded to said frame and proof mass.

7. A differential capacity of sensor comprising:
- an angular ring-shaped frame;
- a circular cylindrical proof mass of at least one gram disposed within said angular ring-shaped frame;
- a pair of continuous membranes disposed between said frame and said proof mass, said proof mass being coupled to said pair of continuous membranes and opposing upper and lower surfaces of said proof mass being coupled to said membranes at a central location of said proof mass;
- movable capacitive plates disposed on said membranes; and
- an upper and lower substrate having fixed capacitive plates disposed within cavities defined therein opposing said movable capacitive plates on said membranes,
- whereby a robust, compact sensor is provided with high shock resistance and small electrode spacing for increased sensitivity.

* * * * *